United States Patent [19]

Li et al.

[11] Patent Number: 5,277,737

[45] Date of Patent: Jan. 11, 1994

[54] DIELECTRIC CURING OF ADHESIVES

[75] Inventors: Chi Li, Orchard Lake; Ray A. Dickie, Northville, both of Mich.

[73] Assignee: Ford Motor Company, Dearborn, Mich.

[21] Appl. No.: 997,636

[22] Filed: Dec. 28, 1992

Related U.S. Application Data

[63] Continuation of Ser. No. 633,742, Dec. 24, 1990, abandoned.

[51] Int. Cl.$^5$ .......................................... B32B 31/00
[52] U.S. Cl. ................................................ 156/274.8
[58] Field of Search .............. 156/272.2, 273.9, 274.4, 156/274.8, 275.5, 275.7, 379.6, 379.7, 379.8, 380.2, 380.3; 219/10.41, 10.53

[56] References Cited

U.S. PATENT DOCUMENTS

| | | | |
|---|---|---|---|
| 2,372,929 | 4/1945 | Blessing | 156/273.9 X |
| 2,473,188 | 6/1949 | Albin . | |
| 2,504,754 | 4/1950 | Sweeny . | |
| 2,727,560 | 12/1955 | Bradley et al. | 156/380.3 X |
| 3,291,671 | 12/1966 | Hecht . | |
| 3,321,019 | 5/1967 | Dmitroff et al. | 416/229 |
| 4,293,363 | 10/1981 | Wakabayashi et al. . | |
| 4,320,276 | 3/1982 | Takeuchi et al. . | |
| 4,332,713 | 6/1982 | Lehmann | 156/328 |
| 4,420,359 | 12/1983 | Goldsworthy | 156/379.8 |
| 4,427,865 | 1/1984 | Watanabe . | |
| 4,602,139 | 7/1986 | Hutton et al. . | |
| 4,626,642 | 12/1986 | Wang et al. . | |
| 4,648,921 | 3/1987 | Nutter et al. | 156/78 X |
| 4,650,947 | 3/1987 | Hutton et al. . | |
| 4,654,495 | 3/1987 | Hutton et al. . | |
| 4,749,833 | 6/1988 | Novorsky et al. . | |
| 4,762,864 | 8/1988 | Goel et al. . | |
| 4,776,915 | 10/1988 | Natori et al. . | |
| 4,798,925 | 1/1989 | Ishizaka . | |
| 4,814,587 | 3/1989 | Carter . | |
| 4,816,633 | 3/1989 | Mucha et al. . | |
| 4,878,978 | 11/1989 | Goel et al. . | |

FOREIGN PATENT DOCUMENTS

| | | |
|---|---|---|
| 800129 | 11/1968 | Canada . |
| 0339493 | 2/1989 | European Pat. Off. . |
| 0339494 | 2/1989 | European Pat. Off. . |
| 809685 | 8/1951 | Fed. Rep. of Germany . |
| 2433366 | 1/1975 | Fed. Rep. of Germany . |
| 914433 | 10/1946 | France . |
| 1582931 | 10/1969 | France . |
| 2502441 | 9/1982 | France . |
| 48-25526 | 7/1973 | Japan ........................ 156/274.4 |
| 56-070914 | 6/1981 | Japan . |
| 572292 | 10/1945 | United Kingdom . |
| 964298 | 7/1964 | United Kingdom . |

OTHER PUBLICATIONS

"Linear Applications Handbook", National Semiconductor, pp. 262, 257.

Readdy, Jr., "Plastics Fabrication by UV, IR, Induction, Dielectric, & Microwave Radiation Methods," Plastec Report R43, Picatinny Arsenal, Dover, N.J., Apr. 1976, pp. 106–107.

*Primary Examiner*—David A. Simmons
*Assistant Examiner*—Chester T. Barry
*Attorney, Agent, or Firm*—Damian Porcari; Roger L. May

[57] ABSTRACT

A method and apparatus for bonding a non-conductive member to a conductive member by applying adhesive between mating surfaces of the non-conducting and conducting member and placing an electrode adjacent the non-conductive member overlying the mating surface. An RF generator applies an electric field between the non-conducting and conducting members to cure the adhesive by dielectric heating.

2 Claims, 9 Drawing Sheets

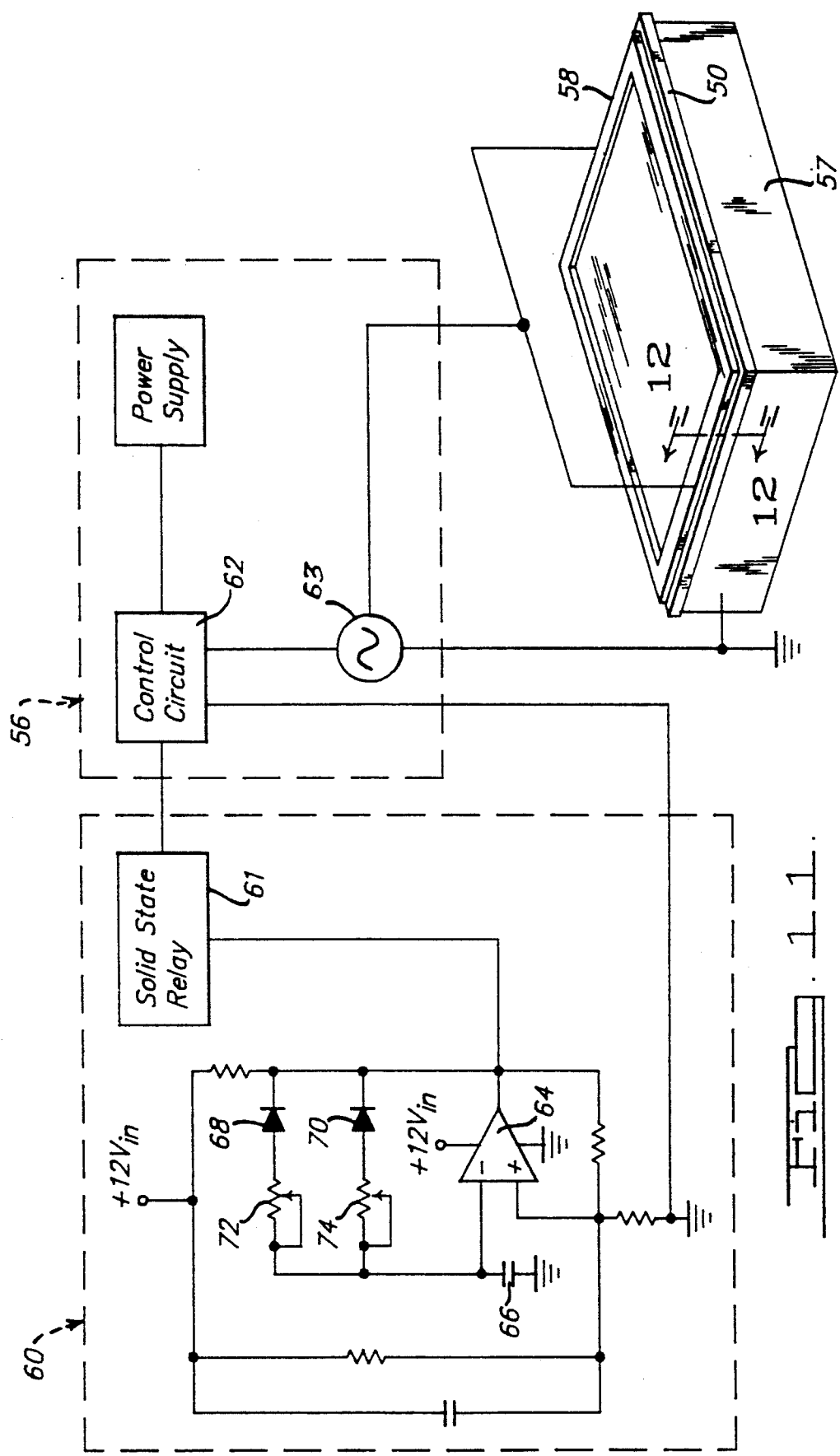

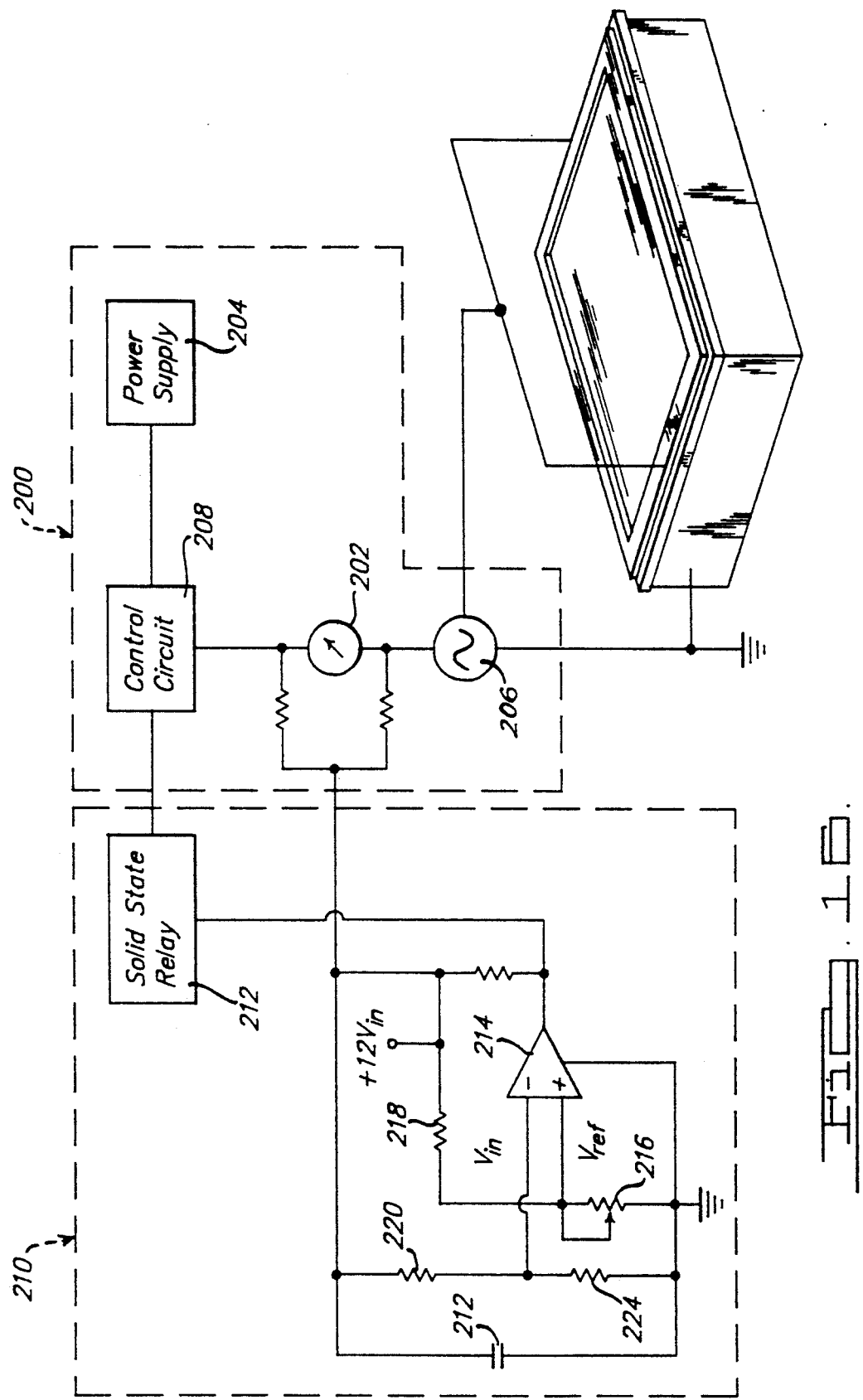

DIELECTRIC CURING OF ADHESIVES

This invention relates to commonly assigned copending U.S. patent application Ser. No. 632,830, titled REVERSIBLE ATTACHMENT USING DIELECTRIC HEATING, filed on even date herewith.

This application is a continuation of U.S. patent application Ser. No. 07/633,742, filed Dec. 24, 1990 now abandoned.

FIELD OF THE INVENTION

The present invention relates to a method and apparatus for curing adhesives by dielectric heating. More specifically, the present invention relates to a method and apparatus of bonding a member to a conducting frame by passing a high frequency electric field through the adhesive. The molecules within the adhesive respond to the electric field and cause a dielectric heating of the adhesive to cure.

BACKGROUND OF THE INVENTION

Modern adhesives cure at a very slow rate, sometimes in the order of days. It is known to speed the curing of these adhesives as well as improving increased bond strength by heating the adhesives. Various means exist for heating adhesives to aid in their curing.

Several common means of heating adhesives include conduction, convection and radiant heating of the adhesive. Conduction heating is achieved by placing a wire in the adhesive and passing a current through the wire. The current heats the wire which in turn heats the adhesive. Conduction heating has the disadvantage of requiring a conductive wire to be placed in the adhesive bond. The wire is difficult to be properly located within the adhesive and weakens the bond.

Radiant or convection heating is achieved by placing the part to be bonded with adhesive in a radiant or convection oven. The adhesive is heated indirectly by heat passing through the parts. Convection or radiant heating requires that both the parts and the adhesive be heated in an oven. Some parts bonded with adhesives such as thermoplastics, may weaken or deform when heated to the temperatures necessary to cure the adhesive. Further, radiant and convection heating generally require upwards of twenty minutes to cure the adhesive.

Another method of curing adhesives by concentrating heat within the adhesive is taught and disclosed in U.S. Pat. No. 4,749,833, issued Jun. 7, 1988 to Novorsky et al. Novorsky et al. teaches induction heating of an adhesive. Spherical particles of steel are placed within the adhesive and moved in rolling contact with one another to establish an accurate space between two members to be bonded in an adhesive joint. The adhesive joint is placed between or adjacent to an induction coil and a current is passed through the coil. The current passing through the coil induces the spherical particles to heat thereby heating the surrounding adhesive. As in the method of conduction heating, induction heating also requires the addition of foreign metal particles within the adhesive thereby decreasing the strength of the bond.

It is known to heat polar materials including adhesives in a high frequency electric field by a process called dielectric heating. U.S. Pat. No. 3,291,671, issued Dec. 13, 1966 to Hecht, teaches a fusing of plastic films by dielectric heating. A water containing paper board separated by one or more polyethylene films is placed between two electrodes. A radio frequency (RF) generator is attached to the electrodes and passes an electric field through the polyethylene film and water containing paper board. The polyethylene films fuse to one another and to the paper board. This illustrates dielectric heating but not the dielectric heating of an adhesive to promote curing.

Dielectric heating to cure adhesives is shown and disclosed in EPO Patents 0,339,494 and 0,339,493, both filed Apr. 20, 1989 and U.S. patent application Ser. No. 07/187,358 filed May 28, 1988 now U.S. Pat. No. 4,941,936. These patents teach the bonding of a fiber-reinforced plastic (FRP) exterior member to a U-shaped FRP reinforcement member. A bead of two-part epoxy resin adhesive is placed between the exterior and reinforcement members. The bonded assembly is then moved to a chamber containing a dielectric heater. The first electrode having roughly the same contour as the outer skin is placed against the outer skin member and a second electrode having a concentrator is placed over the reinforcement member. A high-frequency electrostatic field of between 300 and 8,000 volts is applied through the electrodes. The high frequencies range between 25 and 40 MHz. This apparatus teaches curing times of approximately 30 to 40 seconds. The apparatus uses a plurality of electronically isolated concentrators rather than a single elongated electrode. The patents teach that an elongated electrode used to bond parts exceeding 47 inches at 34 MHz experiences uneven heating. This is believed to result from peaks of energy radiating from the elongated electrode as the length approaches 1/15th of the wavelength of alternating voltage. The EPO patents require a separate electrode for both surfaces of the members being bonded.

The EPO patents teach away from the use of long electrodes (i.e., electrodes longer than 1/15th the RF wavelength) by teaching the need for a plurality of isolated concentrators. Additionally, the EPO patents do not teach the use of a conductive frame as an electrode.

It is a primary object of this invention to utilize RF dielectric heating for bonding a member to a conducting frame. The conducting frame is used as one electrode of the RF circuit. Nonuniform heating of elongated plates is reduced by pulsing the RF electric field. Adhesive cure can be monitored and controlled by the plate current between the electrodes thereby minimizing the time and energy necessary for dielectric heating.

SUMMARY OF THE INVENTION

The present invention relates to a method of bonding a non-conductive member to a conductive member by applying adhesive between mating surfaces of the conductive and non-conductive members. An electrode is placed adjacent the non-conductive member and overlying the matting surfaces. An RF generator applies a high frequency electric field between the electrode and conductive member. The high frequency electric field heats and cures the adhesive. To avoid uneven heating, the electric field may be pulsed.

The frame is made of conductive material such as steel, aluminum, copper, etc. and is used both as a reinforcement member or structure and as an electrode for the dielectric heating of an adhesive. A panel made either of conductive or non-conductive material is bonded to the frame with an adhesive having dielectric properties. In instances where both the frame and Panel are made of the conductive material, a radio frequency electric field is applied to the frame and to the panel to create an electric field which excites the polar molecules within the adhesive generating a dielectric heating effect. This heating acts to cure the adhesive. It is possible for dielectric heating to be used for bonding a metal panel to a metal frame, however, other methods such as induction and convection heating are particularly well adapted for curing adhesives between metal components.

RF heating of an adhesive in this invention will be primarily directed to bonding a non-conductive panel to a conductive frame. Suitable non-conductive materials include glass, ceramics, plastic, rubber and wood. Particularly preferred for automotive application are the bonding of glass, ceramic and plastic materials to metal. The examples used describe the bonding of a plastic panel to a metal frame but the invention permits other non-conductive materials to be bonded to a conductive frame through RF dielectric heating.

When a non-conductive panel is bonded to a conductive frame, an electrode having a shape approximately the same as the mating surfaces of the joint is placed over the non-conductive panel and aligned to overlie the mating surfaces. The frame member and the electrode are connected to a radio frequency generator and an electric field is applied to the adhesive. The frame member acts as an electrode connected to the radio frequency generator.

To avoid uneven heating of large panels, the radio frequency current applied to the electrodes is pulsed. This pulsing is believed to distribute standing waves along the electrode and reduce hot and cold spots in the joint. This permits the use of long electrodes, i.e. electrodes longer than 1/15th of the wavelength of the electric field.

The state of cure of the adhesive is proportional to the plate current between the electrodes. As the adhesive cures, its dielectric loss decreases thereby reducing the plate current between the electrodes. When the plate current drops to a predetermined threshold, the adhesive is sufficiently cured and the current stopped.

Thermoset adhesives represent a very important class of materials for automotive manufacturing. Once properly cured, thermoset adhesives provide dimensional stability due to the chemical cross-links in their molecular structure. Since the extent of cure of the cross-linked polymers is one of the most important factors in governing the performance of the final products, it is important to properly cure the adhesive of a bond part.

Radio-frequency dielectric heating is an efficient way to convert electrical energy into thermal energy for heating a material possessing a high dielectric constant at radio frequencies. When a material is subjected to a high frequency electric field on the order of 10–100 MHz, polarized species such as dipoles and ions are excited and vibrate along with the field. The high-frequency translational motion of the polarizable species generates a large amount of frictional heat which can be employed to rapidly cure thermoset adhesives. Since the energy conversion takes place within the adhesive material in the joint, dielectric heating is a fast and efficient method for heating adhesives. Because the heat generated by the dielectric heating is concentrated within the adhesive, less energy is required for curing bonded parts.

Dielectric heating of a non-conductive member to a conductive member only requires one electrode. The non-conductive member can be bonded anywhere on the conductive member because the RF electric field can occur along the entire length of the conductive member. Pulsing the electric field permits low cost long electrodes to evenly cure an adhesive. The extent of curing can be monitored through the plate current so that the dielectric heating process can be stopped as soon as the adhesive has been sufficiently cured.

These and other objects, features and advantages of the present invention are shown in the following description and by reference in the accompanying drawings.

DETAILED DESCRIPTION OF THE DRAWINGS

FIG. 11 shows a circuit diagram for a pulsing circuit attached to an RF dielectrically heated assembly.

FIG. 16 shows a circuit diagram for a shutoff circuit attached to an RF dielectrically heated assembly.

DETAILED DESCRIPTION OF THE PREFERRED EMBODIMENTS

Figure 1:
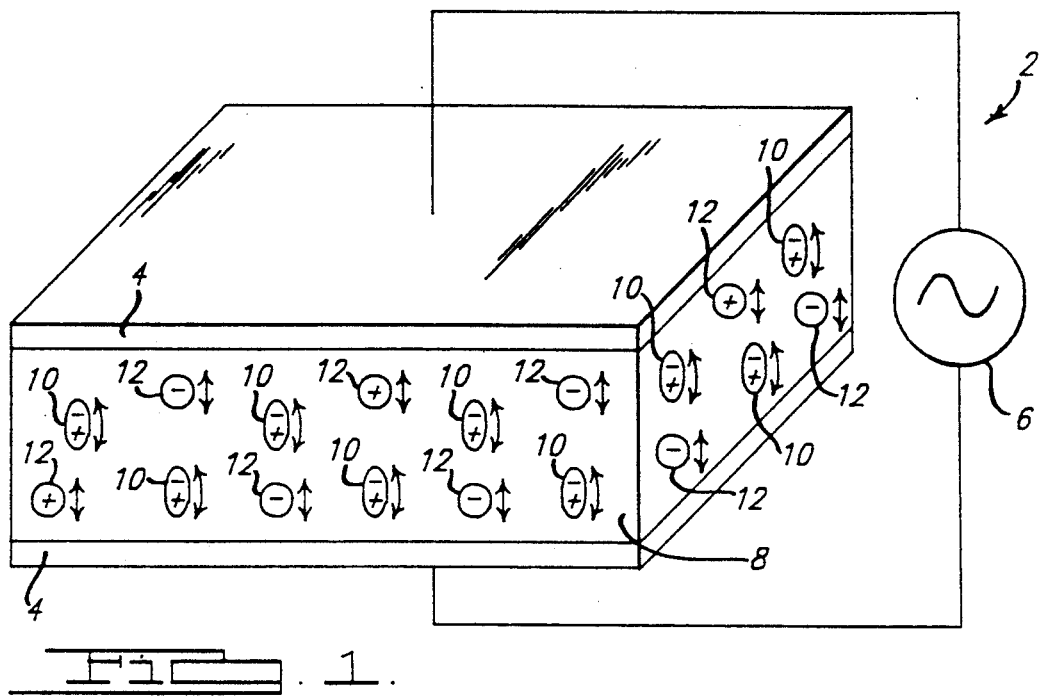
FIG. 1 shows a schematic of thermoset material under electric excitation.

Shown in FIG. 1 is a schematic representation of a thermoset adhesive under an electric excitation. A radio frequency dielectric heater 2 comprises electrodes 4 and RF generator 6. A thermoset adhesive 8 comprising permanent and induced dipoles 10 as well as ionic species 12. When an electric field is applied to electrodes 4, the permanent and induced dipoles 10 are charged and rotate with the alternating electric field at an excitation frequency corresponding to the electric field applied. The ionic species 12 move linearly in a translational motion. The charging process stores electric energy in the adhesive while the induced molecular motion dissipates this stored electric energy. The energy dissipation is governed by the molecular relaxation process and is highly frequency and temperature dependent.

Figure 2:
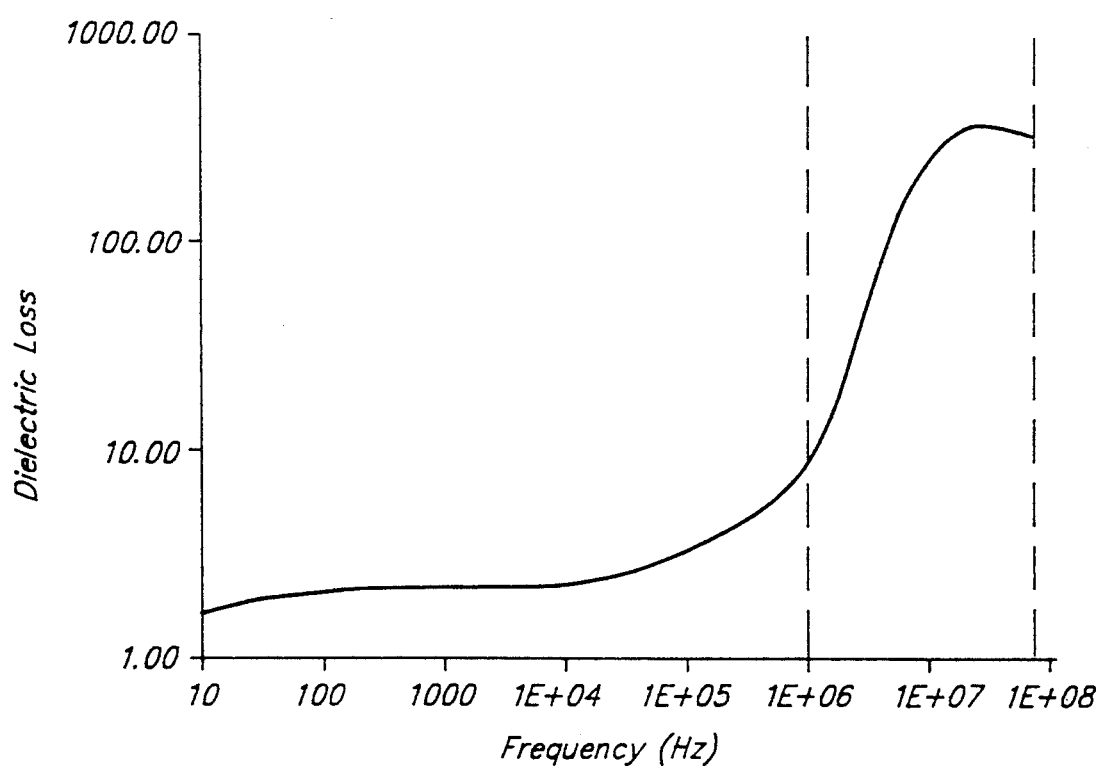
FIG. 2 shows a graph of dielectric loss vs. electric field frequency.

Shown in FIG. 2 is the relationship between dielectric loss factor and the excitation frequency for a low molecular weight epoxy adhesive. Radio frequencies between 1 and 100 MHz correspond to high dielectric loss factors for this adhesive. A large amount of heat is generated in the adhesive when it is subjected to an electric field in these radio frequencies. The curing reaction of the adhesive is activated by this heat. A cross-linking reaction transforms the liquid resin to a solid material for bonding a structure.

Figure 3:
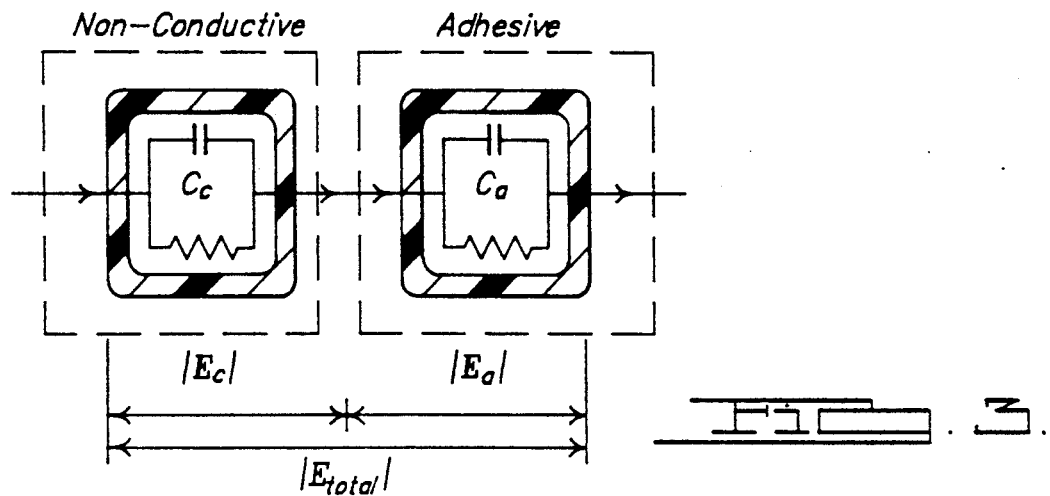
FIG. 3 is a schematic illustration of an equivalent circuit diagram for a non-conductive member to adhesive joint subjected to an electric field.

An adhesive joint heated by the RF electric field acts as a multi-layer capacitive circuit as shown in FIG. 3. When a panel having a dielectric property such as a composite panel is adhered to a metal frame, the energy flux into the adhesive layer is a combination of the dielectric properties of both the adhesive and the capacitance of the composite panel as well as the joint geometry. The capacitance of a particular joint which consists of a layer of adhesive sandwiched between a steel and composite panel, is explicitly related to the geometry and dielectric properties of the adhesive resin and the composite material by the following equation:

$$C = \frac{C_a C_c}{C_a + C_c} = \frac{\epsilon_o A \epsilon^*_c \epsilon^*_a}{\epsilon^*_c d_a + \epsilon^*_a d_c} \quad \text{Equation 1}$$

where;
C = Total capacitance,
$C_a$ = Capacitance of the adhesive,
$C_c$ = Capacitance of the composite Panel,
$\epsilon_o$ = Dielectric constant of free space,
$\epsilon^*_c$ = Dielectric constant of the composite panel,
$\epsilon^*_a$ = Dielectric constant of the adhesive,
A = Area of oscillating electric fields in the adhesive joint,
$d_c$ = Thickness of the composite panel, and
$d_a$ = Thickness of the adhesive layer.

Dielectric constants $\epsilon^*_c$ and $\epsilon^*_a$ are complex quantities and can be further separated into real and imaginary components by the following equation:

$$\epsilon^* = \epsilon' + j\epsilon'' \quad \text{Equation 2}$$

where;
j = Square root of −1,
$\epsilon'$ = Dielectric constant (real part), and
$\epsilon''$ = Dielectric loss (imaginary part).

The dielectric constant $\epsilon'$ is Proportional to the amount of electrical energy stored in the dielectric medium. The dielectric loss is related to the dissipation of the electrical energy by the medium. The ratio of the dielectric loss to the dielectric constant is termed the dielectric loss factor tanδ. It is represented by the following equation:

$$\tan\delta = \frac{\epsilon''}{\epsilon'} \quad \text{Equation 3}$$

The dielectric constant $\epsilon'$ and the dielectric loss factor tanδ of material such as an adhesive is determined by its chemical composition and molecular structure. For the purposes of dielectric heating, a higher dielectric loss factor of the adhesive material is desired as a higher fraction of the electromagnetic energy is dissipated to heat when subjected to the high frequency electric field. Most thermoset adhesives possess a high dielectric loss because the monomers, oligomers and low-molecular weight adhesives are highly polarizable. For example, the loss factor tanδ of uncured epoxy adhesives can be as high as 10–100 which indicates that 90–99% of the electric energy is converted to heat. The amount of heat generated per unit volume of adhesive, dH/dt, induced by the radio frequency electric field may be represented by the following equation:

$$\frac{\partial H}{\partial t} = |E_a|^2 \omega \epsilon''_a = |E_a|^2 2\pi f \epsilon''_a \quad \text{Equation 4}$$

where:
$|E_a|^2$ = root means squared field strength of the RF electric field over the adhesive layer,
ω = Radian frequency,
f = Frequency of the oscillating electric field, and
$\epsilon''_a$ = Dielectric loss of the adhesive Equation 4 indicates that RF heat generation is proportional to the frequency of the excitation field, field strength and that the dielectric loss of the material is frequency dependent. The influx of electromagnetic energy into the joint, $q_r$, is the time averaged rate of energy dissipation. This rate may be represented by the following equation:

$$q_r = dH/dt = |E_a|^2 2\pi f \epsilon''_a. \quad \text{Equation 5}$$

The root mean squared field strength over the adhesive layer, $|E_a|$, can be calculated from the joint geometry and the dielectric parameters of the adhesive joint by the following equations:

$$|E_{total}| = d_c|E_c| + d_a|E_a|. \quad \text{Equation 6}$$

$$\epsilon^*_a|E_a| = \epsilon^*_c|E_c|. \quad \text{Equation 7}$$

where; $|E_{total}|$ is Total root mean squared of the radio frequency potential applied to the composite and adhesive layers $|E_c|$ is the field strength over the composite panel.

The rate of heat generation can be calculated from Equations 4–7 provided the material properties are known. The dielectric properties of the materials, however, are strongly dependent on the frequency of the electric field, the state of the cross-link reaction and the temperature of the materials. Therefore, Equations 4–7 must be evaluated together with temperature profile calculations.

The temperature rise of the adhesive in the joint is due to the conversion of high-frequency electromagnetic energy and chemical reaction energy into thermal energy. The thermal energy is stored in the joint as temperature rise if not removed from the joint by heat transport. Therefore, quantitative temperature rise in the joint can be calculated by solving a set of energy equations which describe the heat generation and transport for a given joint geometry. The rate of temperature rise in the joint is governed by the differential rates between the heat generation and transport as well as a set of thermal properties of the joint materials. If the thermal conductivity k, the density of the resin ρ, and heat capacity $C_p$ are assumed to be independent of temperature, the energy equation in differential form can be described as: transient = conduction + RF heat generation + chemical exotherm $$\rho C_p \frac{\partial T}{\partial t} = k\nabla^2 T + q_r(T,t) + q_c(T,t) \qquad \text{Equation 8}$$

where; $q_r(T,t)$ and $q_c(T,t)$ designate the rates of heat generation by RF dielectric field and chemical reaction, respectively.

The rates of heat generation are highly dependent on functions of temperature and time. Similar equations without the heat generation terms can be written for the SMC composite and steel substrates. By solving these equations with a set of reasonable boundary conditions, the temperature distribution in the adhesive joint at a given RF exposure time can be calculated.

The amount of power required for heating a dielectric adhesive for a specific application may be calculated using an equation derived from the macroscopic energy balance:

$$P = \frac{(2.5\rho_s C_{ps}(l_s d_s w_s) + \rho_a C_{pa}(l_a d_a w_s))(T_{cure} - T_0)}{1000\xi t_c} \qquad \text{Equation 9}$$

where;
P = power in kW,
$T_0$ = temperature of the environment,
$l_s$ and $l_a$ = bond line length of steel frame and the adhesive, respectively,
$d_s$ and $d_a$ = thickness of the steel frame and the adhesive, respectively,
$w_s$ and $w_a$ = bond line width of the steel frame and the adhesive, respectively,
$t_c$ = RF heating cycle time in seconds,
$\rho_s$ and $\rho_a$ = density of steel and adhesive respectively,
$C_{ps}$ and $C_{pa}$ = heat capacity of steel and adhesive respectively, and
$\xi$ = efficiency of the dielectric generator and output circuit.

Equation 9 is useful for estimating the power requirements for specific RF bonding of a composite panel to a steel frame using a dielectric adhesive. Thermal constants for metal frames, composite panels and adhesives are shown in Table I below:

TABLE I

| Typical Thermal Properties of Materials for Adhesive Bonding | | | | |
|---|---|---|---|---|
| Material | k J/sec cm °C. | $\rho$ J/cm$^3$ | $C_p$ J/g °C. | $\Delta$H J/g |
| Aluminum | 16.6 | 2.73 | 0.96 | |
| Steel | 0.44 | 7.84 | 0.46 | |
| Filled SMC | 0.0021 | 1.8 | 1.67 | |
| Filled Epoxy Adhesive | 0.0069 | 1.9 | 1.25 | 240 |

Experimental Results and Examples

Example 1

Figure 4:
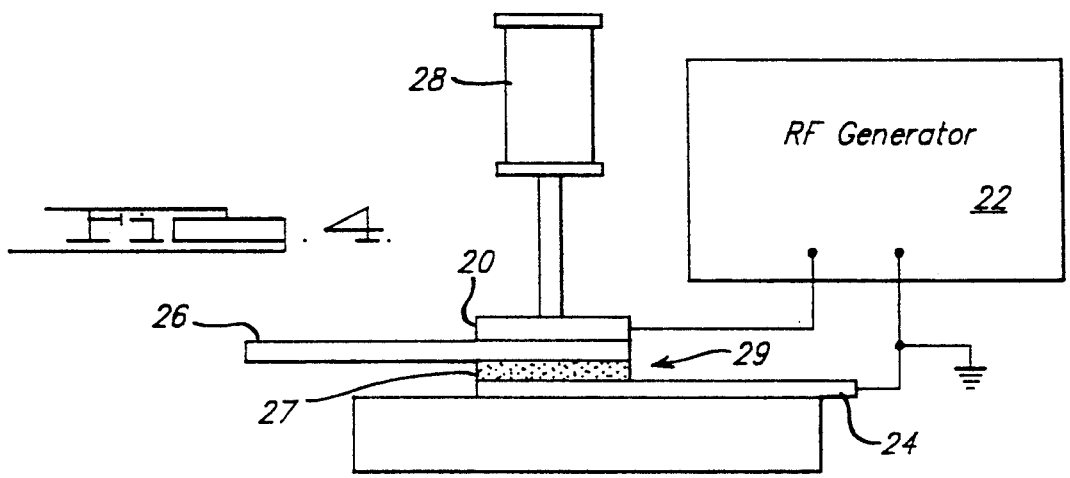
FIG. 4 shows a schematic representation of RF dielectric heating of a composite panel to a metal member.

An example of RF dielectric heating of an adhesive between an SMC panel and an Electro-Galvanized Steel (EGS) member is shown in FIG. 4.

A Kabar 10 kW radio-frequency generator with a pneumatic press (Kabar Manufacturing Company, Farmingville, N.Y.) was used for curing the adhesively bonded joints. The oscillating frequency of the RF generator 22 is 27.12 MHz which is approved for industrial processes by Federal Communications Commission. A 0.9"×.9"×0.5" aluminum block was used as upper electrode 20 during the RF dielectric heating. Generator 22 supplied an electric field to an EGS member 24 and electrode 20. An SMC composite panel 28 was placed over a 0.75 mm bead of epoxy adhesive 27, CY-4551, supplied by American Cyanamid Company. A pneumatic press 26 applied 5.0 psi pressure to the SMC-EGS joint assembly 29. An electric field was applied to electrode 20 and steel member 24. Various samples were heated for times ranging from 5 to 30 seconds followed by 0 to 20 second holding under pressure.

The SMC-EGS joint assembly 29 was tested for its tensile strength by using an Instron Universal Testing Instrument (Model 1125), at a rate of 1.0 mm/min crosshead speed. The joint was pulled to fail at room temperature. An SMC spacer was bonded to the end of the EGS member in each joint to maintain the joints symmetry during the tensile deformation.

A Mettler TA-3000 differential scanning calorimeter (DSC) was used to determine the extent of cure of the structural adhesive. The cured adhesive samples were analyzed in 5° C./min DSC scans to determine the the residual heat of reaction as well as the glass transition temperature $T_g$. Standard DSC procedures were used for experiment and data calculation. The total heat of reaction which takes into account both the exothermic reaction of the adhesive curing and the dielectric heating of the adhesive is found to be about 240 J/g. The extent of reaction of this resin in the SMC-EGS joint assembly 29 was found to be 85% complete after being heated in a RF electric field for only 12 seconds.

The bond strength data of the one-part epoxy CY-4551 lap-shear joints are listed in Table II below:

TABLE II

| Bond Strength of RF and Oven-Cured Joints | | | |
|---|---|---|---|
| Sample | Cure Time | Strength MPa | Failure Mode |
| 180° C. oven | 20 min. | 5.575 + 0.12 | SMC fiber tear |
| 0.5 kW RF | 5 sec. | 1.960 | cohesive |
| 0.5 kW RF | 10 sec. | 3.145 | cohesive |
| 0.5 kW RF | 15 sec. | 3.910 | cohesive |
| 0.5 kW RF | 20 sec. | 5.145 | SMC fiber tear |

Figure 5:
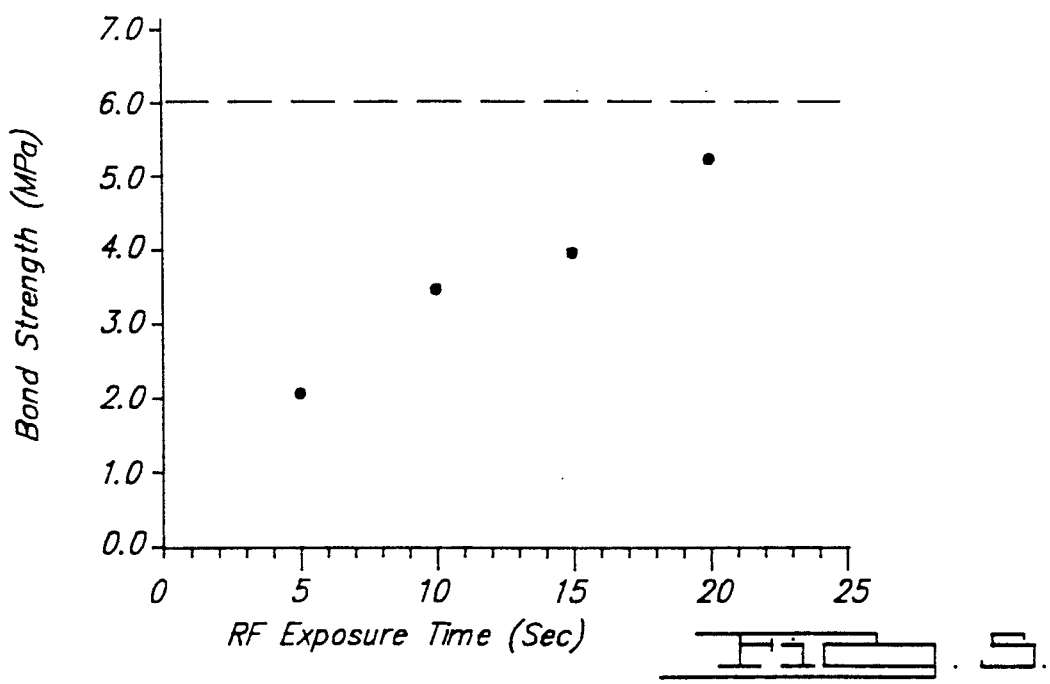
FIG. 5 shows a graph of bond strength vs. time for a dielectrically heated joint.

The failure mode of the 180° C. oven-cured joints is exclusively fraction in the SMC composite panel. The SMC composite panel 26 to metal bond is controlled by the integrity of the SMC material. The RF bonded joints exhibit some strength variations depending on the details of sample preparation. For example, the ultimate tensile stress of the lap-shear coupon increases with an increase in the RF dielectric heating time when the RF output was kept constant. The one-component adhesive in the joints was not heated to high enough temperature at very short RF exposure times (5 to 10 sec.). A shorter RF exposure resulted in an under-cured adhesive resin which failed cohesively within the material. The strength of the RF-cured joints reached that of the oven-cured specimens at the longest cure time of 20 seconds and the failure locus of the joints shifted into the SMC coupons. FIG. 5 illustrates the relationship between the cure time and the bond strength at a constant power level. Bond strength is measured by the shear stress of the lap-shear joint being pulled to failure by a shear testing machinery. Bond strength is given in the units Mega Pascals (MPa).

EXAMPLE 2

Figure 6:
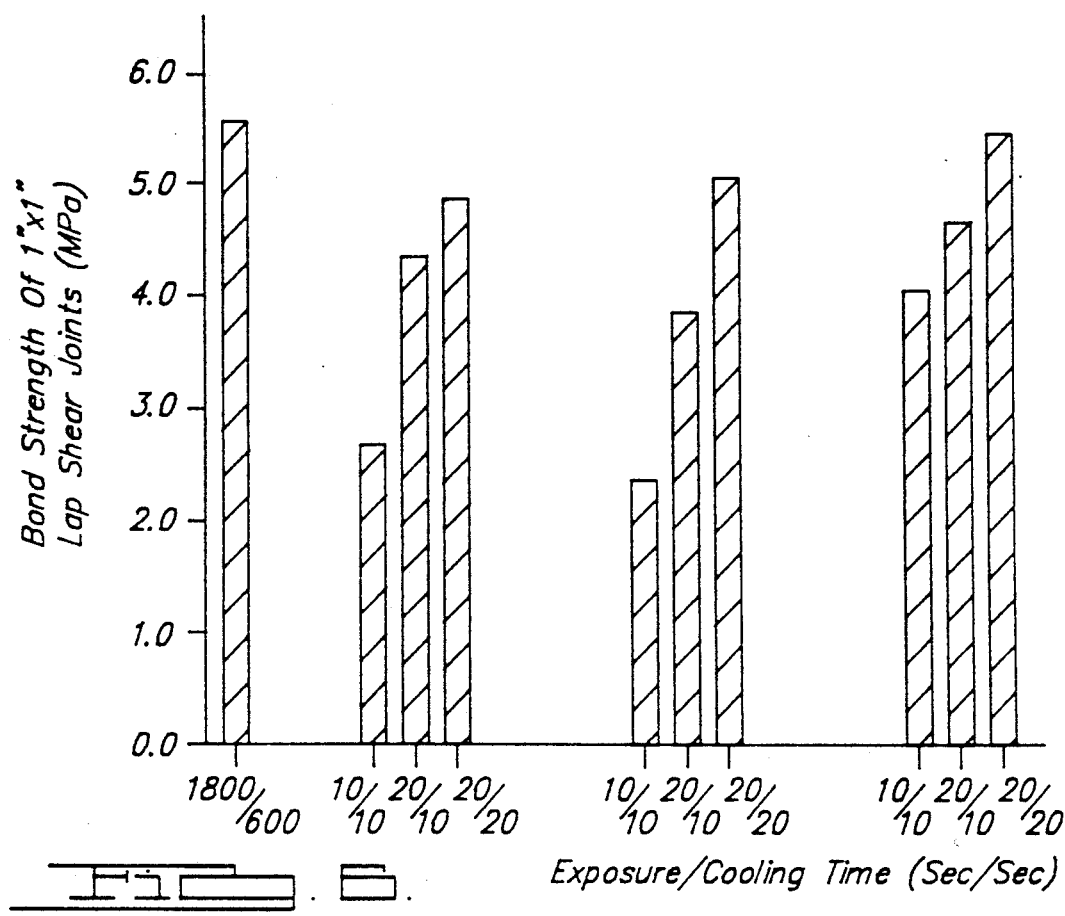
FIG. 6 shows a graph of bond strength for a two component adhesive joint oven cured and cured by dielectric heating.

FIG. 6 illustrates the bond strength of SMC-EGS, SMC-SMC and SMC-E-EGS joints bonded by a two-component epoxy adhesive Fusor 320/322, supplied by Lord Chemical Company, cured in the electric field and an oven cured SMC-EGS joint. It can be seen that the bond performance of the dielectrically bonded specimens after about 30 sec. total cycle time (heating time+holding time) is very close to that of the ultimate strength of the joint prepared by 30 min. oven cure at 90° C. The processing time for RF bonding, however, is orders of magnitude shorter than the oven-cure process. Similar performance of lap-shear joints bonded with the PG-2 two-part epoxy or PG-6500 two-part urethanes both supplied by Ashland Chemical Company, are observed and are summarized in the data listed in Table III below:

TABLE III

Bond Strength of RF Bonded Adhesive Joints[1]

| Adherend | Adhesive | Strength (MPa) | Failure mode |
|---|---|---|---|
| EGS/SMC | PG-6500 | 4.97 ± 0.35 | SMC fiber tear |
| EGS/SMC | FUSOR 320/322 | 5.34 ± 0.42 | SMC fiber tear |
| EGS/SMC | PG-2 | 5.19 ± 0.44 | SMC fiber tear |
| E-EGS/SMC | PG-6500 | 5.12 ± 0.59 | SMC fiber tear |
| E-EGS/SMC | PG-2 | 5.74 ± 0.17 | SMC fiber tear |
| E-EGS/SMC | FUSOR 320/322 | 5.59 ± 0.31 | SMC fiber tear |

[1] A 20 sec. RF exposure was used for preparing all of these joints.

A two-part acrylic adhesive Versilock 250/255 supplied by Lord Chemical Company was also tested between SMC-EGS panels. The two-part acrylic adhesive cures well under RF exposure and showed good bonding to the SMC panel, however the bonded structure failed due to a reaction between the acrylic adhesive and the zinc coating. Acrylic adhesives should be used only on surfaces not having a zinc coating such as cold rolled steel.

These ambient-cure adhesives usually need about 20-30 minutes before reaching to a minimum handling strength. The advantage of using the two-component adhesives for RF bonding is that cure continues to completion at ambient temperatures after RF exposure. The RF dielectric heating can be employed to accelerate the cure initially to develop sufficient handling strength in the joint within the cycle time of the automotive assembly process. As seen from Table III, considerable strength was developed in these joints by 20 second exposures in the RF field.

The extent of reaction of the two-part epoxy materials, Fusor 320/322 and PG-2, was also examined by infrared (IR) spectra and by DSC. There is no detectable difference in the IR spectra between the ambient cured, the RF cured, and the oven cured epoxy adhesives. The ambient cured, the RF cured, and the oven cured specimens possess near identical thermal characteristics and glass transition temperature $T_g$, indicating a similar extent of reaction or cross-link density in these adhesive. Therefore, the cross-link density of the thermoset epoxy materials achieved after RF bonding process is not very different from that formed during conventional cure process.

EXAMPLE 3

Another class of commonly used automotive composite material is fiber glass reinforced vinylester resin processed by resin transfer molding (RTM). The bond strength data of 1"×1" RTM-EGS lap-shear joints are listed in Table IV below:

TABLE IV

Bond Strength of RF Bonded Adhesive Joints[1]

| Adherend | Adhesive | Strength (MPa) | Failure mode |
|---|---|---|---|
| EGS/RTM | FUSOR 320/322 | 7.42 ± 0.45 | RTM sub-interfacial |
| E-EGS/RTM | FUSOR 320/322 | 7.91 ± 0.62 | RTM sub-interfacial |

[1] A 20 sec. RF exposure was used for preparing all of these joints.

The joint strength of the RTM-EGS bonding is much higher than that of SMC-EGS bonding due to the improved composite strength of the RTM material. The failure mode of these joints is primarily sub-interfacial fractures in the RTM coupons possibly due to the profiling agents used during RTM processing.

Figure 7:
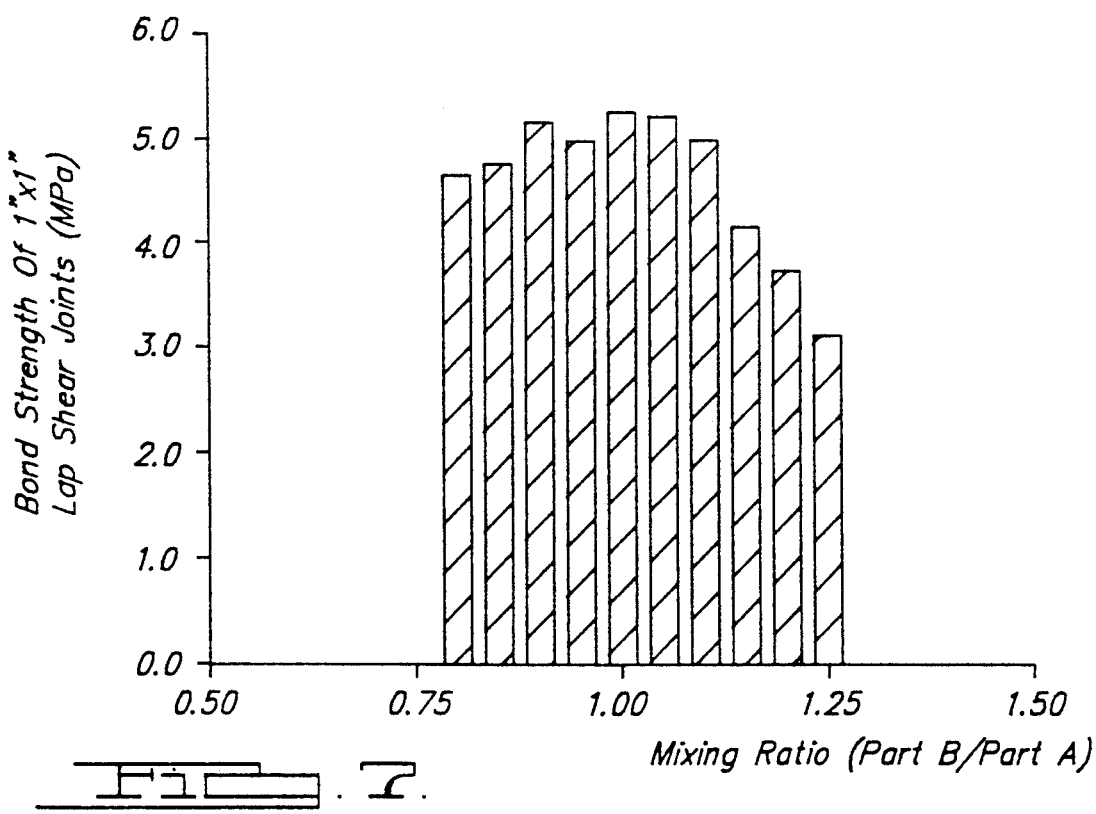
FIG. 7 shows a graph of bond strength for various mixing ratios of a two-part epoxy adhesive.

FIG. 7 illustrates the RF cured adhesive bond strength as a function of the mixing ratio of the Fusor 320/322 two part adhesive. Part A designates either the epoxy or the polyol resin while the amine or the isocyanate cross-linker is referred to part B. A mixing ratio of 1.0 indicates the manufacturer recommended ratio while mixing ratios of 1.1 or 0.9 imply that either the resin or the cross-linker is in 10% excess, respectively. The joint strength is seen to be insensitive to the mixing ratio provided the mixing ratio does not change more than from 1.1 to 0.9. The ultimate bond strength, however, decreases when the cross-linker is in large excess. The failure mode changes to cohesive failure in the adhesive layer as the material becomes very soft due to the large excess of the cross-linking agent. On the other hand, when a large excess of resin was mixed in to the adhesive, the failure locus changed to adhesive failure at the metal/adhesive interface although the modulus of the joint actually increased. Therefore, the mixing ratio of the two-part materials should be kept within ±10% of the manufacturer recommended ratio for optimal bonding performance.

Example 4

Figure 8:
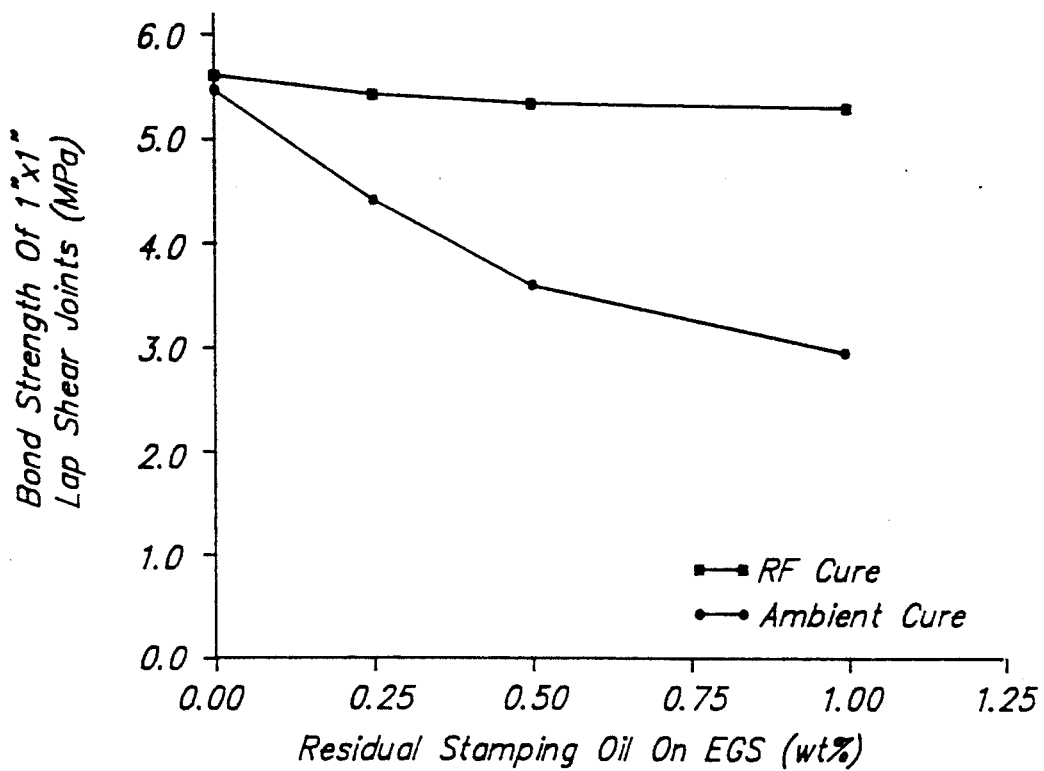
FIG. 8 show a graph of bond strength vs. percent of stamping oil for an RF dielectrically heated joint and an ambient cure joint.

Bonding composite structures to oily steel substrates is generally considered undesirable using conventional adhesive bonding technologies but cannot be avoided for many automobile manufacturing processes. In order to test the sensitivity of the RF bonding process to oily contamination on steel, bond Performance of SMC-EGS joints prepared with a controlled amount of stamping oil on the surface of the steel coupon was evaluated. The strength of RF dielectrically heated joints is not sensitive to the small amount of stamping oil on the steel surface as shown in FIG. 8. On the other hand, the stamping oil causes a significant decrease in the performance of ambient-cured joints. The rapid heating by an intense RF field has an effect of improving bond strength. Although the exact reason for this improved bond strength is not known, it is theorized that the oil is either displaced at the steel adhesive interface or is absorbed into the adhesive layer.

Example 5

Bonding SMC composite panels to coated steel was also evaluated. Specifically evaluated was electrocoated (E-coat) steel manufactured by subjecting the steel to an electric potential while passing through a tank containing an aqueous dispersion of suitably formulated organic coatings. The organic coatings form a uniform deposit on the steel and protect the steel from corrosion. The Electro-coating process is extensively used in the manufacture and assembly of automobiles.

It was observed that the highly cross-linked coating on the steel surface improved the efficiency of dielectric heating by reducing the heat loss through the steel. The coating also serves as an excellent primer or surface pretreatment for improving the bond strength of the adhesively bonded joints. Other coatings, for example paints, primers and inorganic conversion coatings such as phosphates and ceramics can also provide a suitable surface treatment for a dielectrically bonded assembly. Therefore, the RF adhesive bonding process can be employed either before or after the steel is coated.

Example 6

Figure 9:
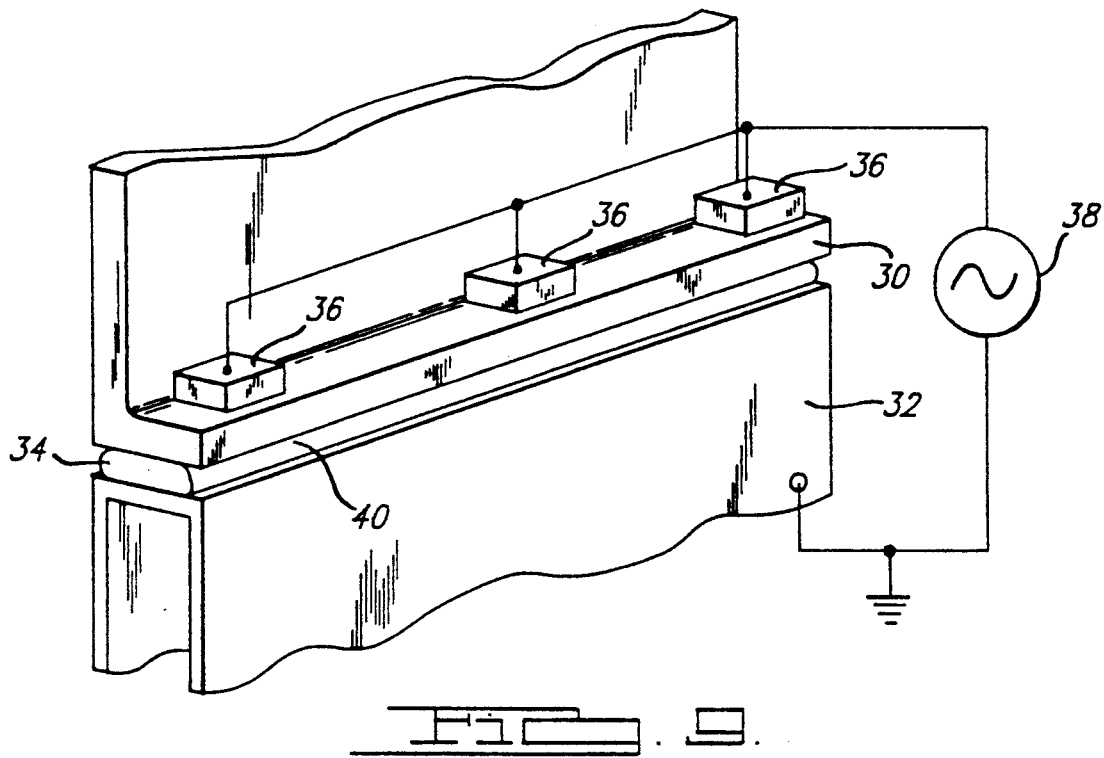
FIG. 9 shows a schematic of an RF dielectric heater used for fixturing.
Figure 10:
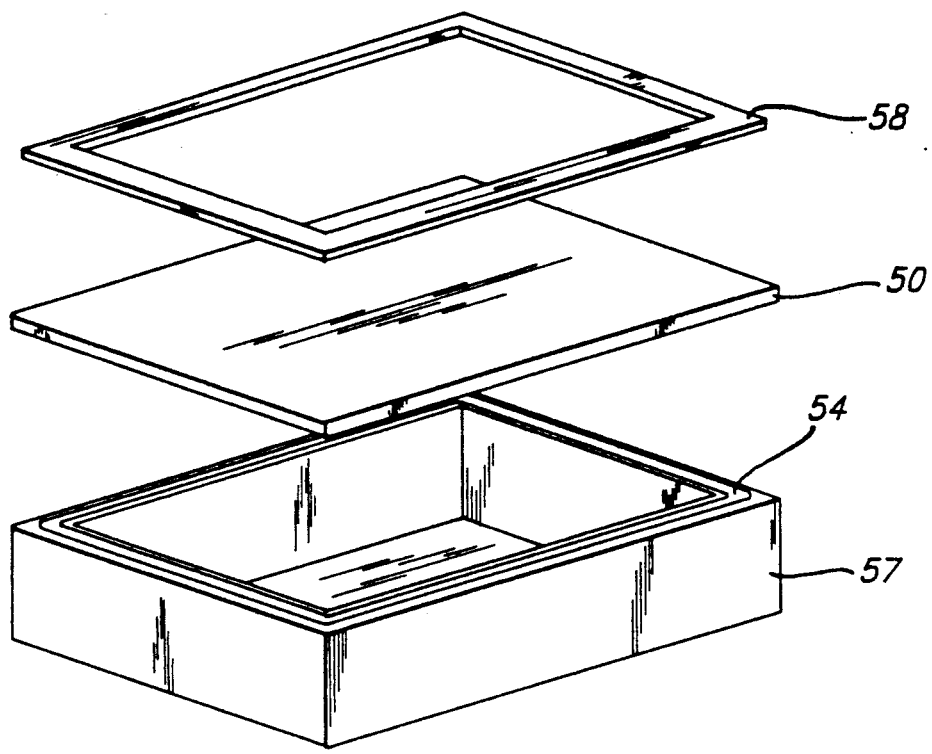
FIG. 10 shows an exploded view of a non-conducting panel bonded to a metal frame using an elongated electrode.
Figure 12:
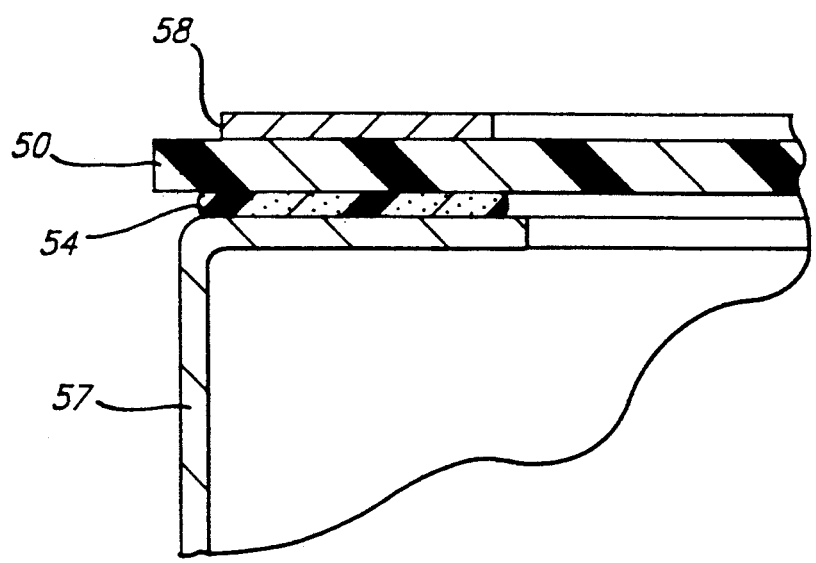
FIG. 12 is a detailed cross-sectional view of the RF assembly taken along the line 12—12 in FIG. 11.

It was also observed that regional or localized curing of joints having large mating surfaces did not effect the bond strength of the overall joint if the entire joint was subsequently cured in the manufacturing process. This is achieved by selectively curing relatively small areas of the mating surfaces. This type of short, small area RF dielectric heating can be useful for fixturing a panel to a frame. Fixturing is defined as attaching a panel to a frame by curing a portion of the adhesive mating surfaces between the panel and frame. An example of fixturing is shown in FIG. 9. A non-conducting panel 30 is bonded to metal frame 32. A dielectrically heatable adhesive bead 34 is placed between panel 30 and frame 32. Panel 30 may be held in place temporarily by a press (not shown). Electrodes 36 are overlaid panel 30 and spaced along bead 34. Electrodes 36 are attached to one terminal of RF generator 38. Frame 32 is attached to the ground terminal of generator 38. An electric field between 10-100 MHz is applied to electrodes 36 and frame 32. The electric field induces the dielectric heating of the adhesive between electrodes 36 and frame 32 in localized areas 40. This heat spot-cures the adhesive in localized areas 40 and is sufficient to hold panel 30 to frame 32.

Fixturing is useful for quickly attaching a panel to a frame when complete cure can be accomplished at a latter time. In the case of bonding a SMC outer body panel to a metal frame, the body panel may be fixtured to the frame in an assembly procedure. After the vehicle body has been assembled by fixturing it is painted and placed in an oven to cure both the paint and any remaining uncured adhesive. The same adhesive can cure to an acceptable bond strength through ambient curing.

Example 7

When applying the methods taught by this invention to bond a large composite Panel such as a fender to a metal frame, the outer electrodes overlying the composite Panel will tend to have a length greater than 1/15th of the curing wave length of the alienating electric field. EPO Patents 0,339,493 and 0,339,494 both incorporated herein by reference, describe uneven heating which result from the use of single elongated electrode. The EPO patents overcame this uneven heating by using a plurality of closely spaced electrodes. This increases the cost and complexity of a dielectric heater as well as causes some uneven heating of the adhesive in the space between adjacent electrodes.

Although not wishing to be bound by the following theory, it is believed that the problem of uneven heating is caused by standing waves occurring in the outer electrode. When an RF electric field is applied to the electrodes, the electric field travels the length of the electrode and is reflected back by the ends. The reflected field is out of phase from the applied field and an interference pattern or standing waves having null areas and peak areas are created. These null and peak areas result in cold and hot spots respectively in the adhesive. To reduce these standing waves, the plate current applied to the electrodes may be pulsed.

FIGS. 10-13 show bonding a large SMC panel 50 to an EGS frame 57 using a pulsed RF electric field. A bead of adhesive 54 is applied along the mating surfaces. Electrode 58 is overlaid panel 50. Electrode 58 is longer than 1/15th of the wave length of the alternating field. If a 27.2 MHz frequency is used, the wave length in inches is 434 inches. Standing waves or uneven heating are expected for electrodes longer than about 29 inches. To avoid uneven heating, the RF electric field applied to electrode 58 and frame 52 is pulsed using the pulsing unit 60 in FIG. 11.

The pulsing unit used can be any type of standard pulse generator. Preferred is a pulsing circuit with a variable duty cycle as shown and described on page 262 of "Linear Application handbook", published by *National Semiconductor*, 1986, incorporated herein by reference. RF generator 56 contains control circuit 62 to control the voltage current and frequency of the electric field created by oscillator 63. Control circuit 62 is of the type included in the commercial RF generator described. Control circuit 62 attaches to solid-state switch relay 61. Relay 61 is attached to pulsing circuit 60. Comparator 64 is connected to the positive terminal of relay 61. The output of comparator 64 is attached to capacitor 66. Capacitor 66 is provided a separate charge and discharge path. One path, through resistor 72 and diode 68 will charge capacitor 66 and set the pulse width. The other path, through resistor 74 and diode 70 will discharge capacitor 66 and set the time between pulses. By varying resistor 74, the time between pulses can be changed without affecting the frequency between pulses. Both resistor 72 and resistor 74 will change the frequency of generator 56. However, generator 56 can be tuned to any desired frequency between 10-100 MHz.

Figure 13:
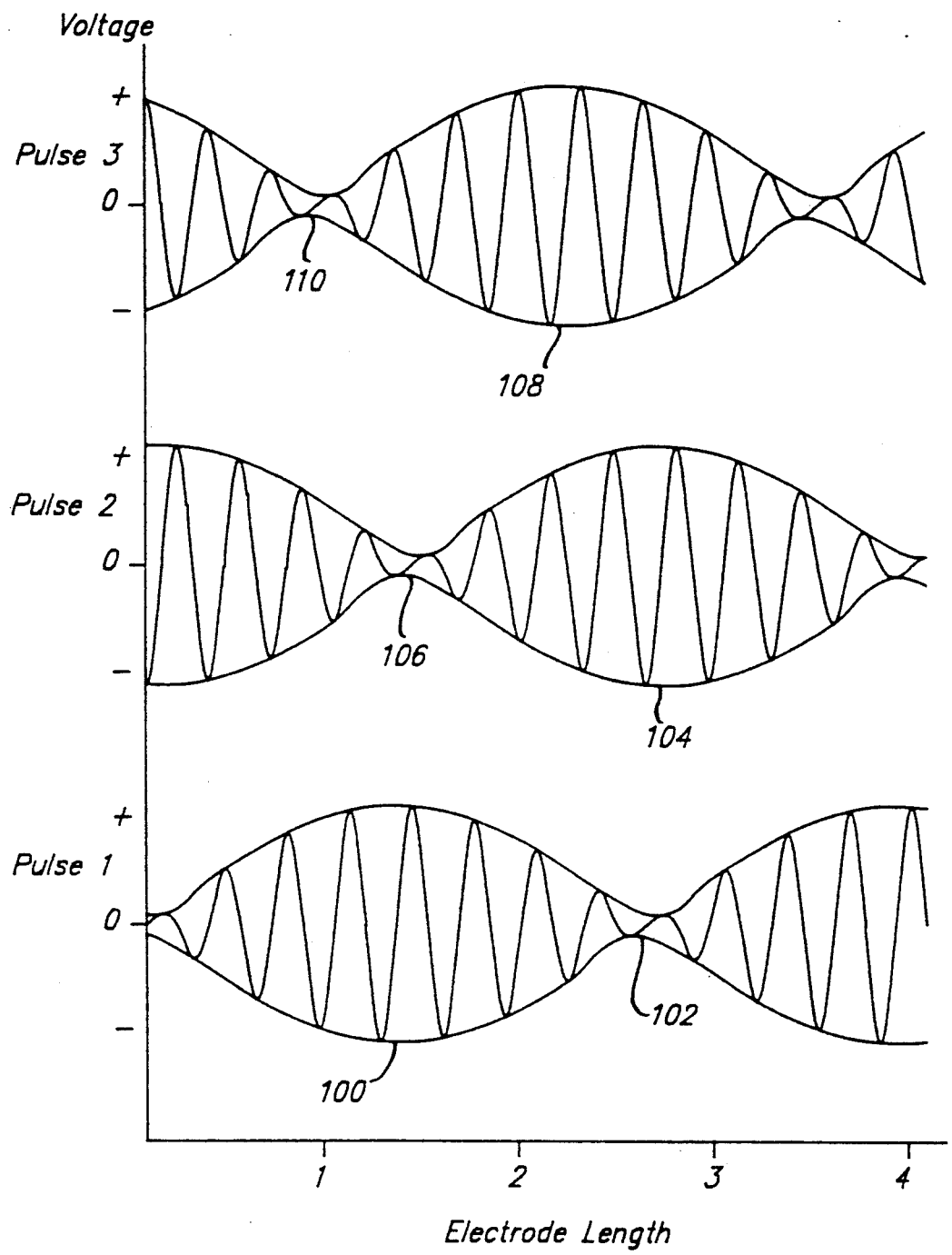
FIG. 13 shows a graph of a pulsed RF electric field.

Pulsing does not eliminate the standing waves, but each pulse changes the physical location of the null and peak areas of the standing wave. Shown in FIG. 13 are three graphs of standing waves occurring along the length of an electrode. Pulse 1 shows a peak occurring at 100 and a null at 102. Pulse 2 causes a new electrical field to begin in the electrode. The standing wave resulting from pulse 2 shows a peak occurring at 104 and a null at 106. Although not wishing to be bound by the following theory, it is believed that each time an alternating current electric field is created in an electrode, the initial voltage may be any voltage between the maximum positive and negative voltages applied. Because this initial voltage is essentially random, each pulse creates an essentially random distribution of standing waves along the electrode. Each individual standing wave is a sinusoidal pattern of peak and null areas occurring along the electrode, but the location of these peak and null areas may occur essentially randomly at the pulsing frequencies used in this embodiment. The peak and null areas generally relate to hot and cold areas respectively along an adhesive being dielectrically heated.

Example 8

Figure 14:
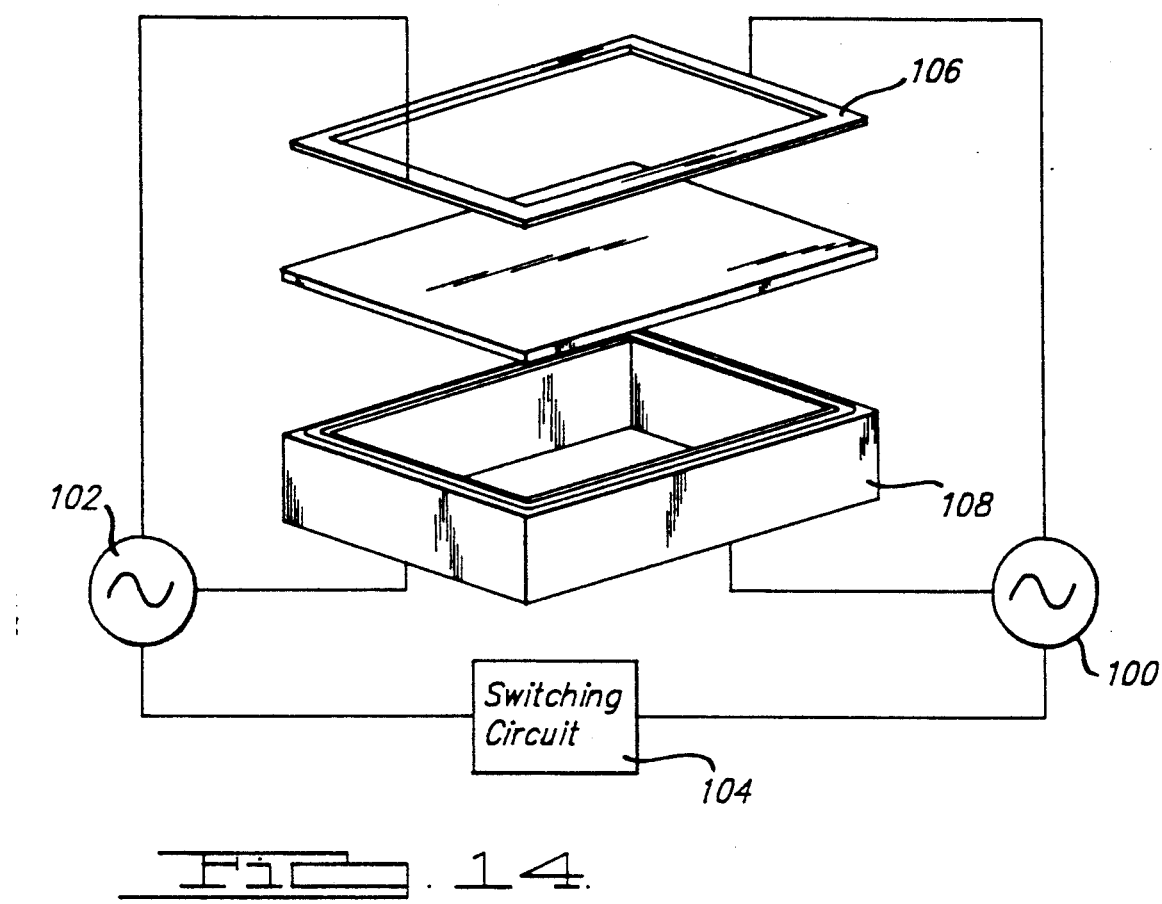
FIG. 14 shows a schematic of an RF dielectric heater having two RF generators.

The pulsing circuit shown in FIG. 11 alternates between applying and removing the RF electric field. Applying the electric field causes the adhesive to heat and removing the electric field stops the dielectric heating. Because the RF electric field is a relatively high voltage in the order of 1,000 to 30,000 volts, the relays which pulse the electric field are large. These relays have a large inertia and it is difficult to create pulse rates faster than about 50 Hz. This limits the electric field to less than 80% of each pulse meaning that 20% or more of the time no dielectric heating occurs. To greater speed the rate of dielectric heating, the pulsing current shown in FIG. 11 can be easily modified to work as a switching circuit between 2 RF generators as shown in FIG. 14. RF generator 100 attached to one side of electrode 106 and RF generator 102 is attached to the opposite side of electrode 102. A switching current 104 similar to the pulsing current shown in FIG. 11 connects RF generators 100, 102. Rather than pulsing the RF electric field, switching circuit 104 alternates between RF generators 100 and 102 thereby maintaining an RF electric field between electrode 106 and frame 208 100% of the time. The adhesive is continuously heated throughout the dielectric heating cycle.

Example 9

The RF electric field applied to a bonded assembly causes a current to pass through the dielectric adhesive. This current is called the plate current and measures the amount of current passing from one electrode to the other.

Figure 15:
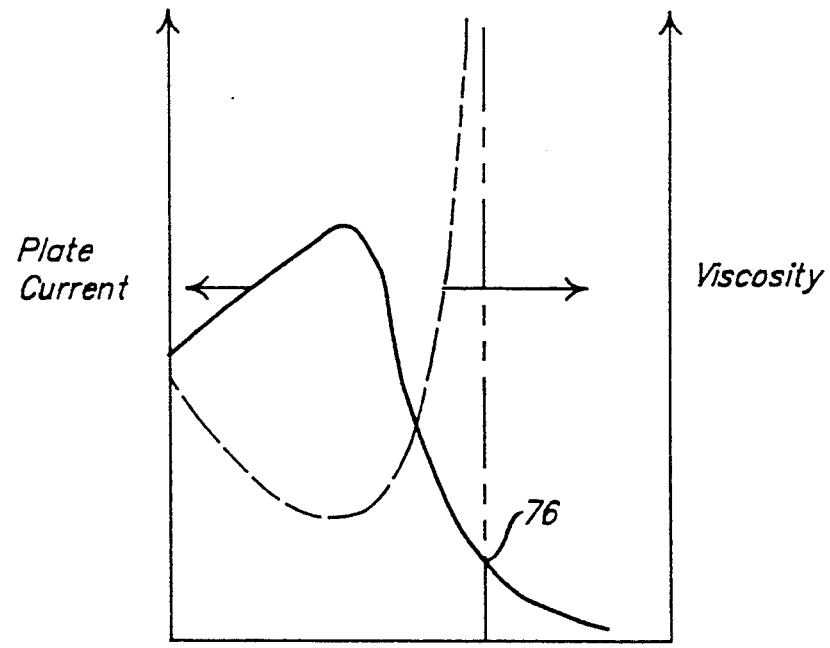
FIG. 15 shows a graph of Plate current and adhesive viscosity vs. RF electric field application time.

Shown in FIG. 15 is a graph of plate current and adhesive viscosity plotted verses time. Before an RF electric field is applied, the adhesive viscosity is at an intermediate level. After the RF electric field is applied, the adhesive begins to heat which decreases its viscosity. As the adhesive becomes less viscous, the plate current increases. This increase is believed due to the decreased internal resistance to movement of the ionic and polar species. As the adhesive further heats, cross-linking occurs between the molecules. The cross-linking increases the viscosity until the adhesive forms a solid. As the adhesive viscosity increases, the mobility of the ionic and polar species reduces thereby reducing the plate current.

It is possible to use the plate current to monitor the amount of cure in an adhesive undergoing dielectric heating. As the adhesive approaches to final cured stage the plate current declines below a threshold level 76. This threshold level varies depending on type of adhesive, bond thickness, joint configuration, dielectric properties of the non-conductive member as well as other variable. A unique threshold must be determined for each application, however, this threshold level can be used as a control to switch off the RF generator.

An example of a circuit which uses plate current to monitor and control an RF generator is shown and described on page 257 of "Linear Applications Handbook", published by *National Semiconductor*, 1986, incorporated herein by reference.

RF generator 200 contains a plate current meter 202, power supply 204, oscillator 206 and control circuit 208. Control circuit 208 is the low voltage portion of RF generator 200 and controls the voltage, current and frequency of the electric field created by oscilator 206. RF generator 200 can be a commercial generator as previously described. A shut-off circuit 210 212 connects to RF generator 200 through control circuit 208. Solid-state relay 212 shuts off the current when a threshold level is reached. Comparator 214 is connected to the positive terminal of relay 212. Comparator 210 is also connected to the plate current meter 202. Variable resistor 216 provides an adjustable reference voltage $V_{ref}$ to comparator 214. The input voltage $V_{in}$ is proportional to the plate current. As the plate current decreases, so does $V_{in}$. $V_{ref}$ is adjusted to equal $V_{in}$ when the plate current equals the threshold level. When the plate current equals threshold level, $V_{in}$ equals $V_{re}$ and relay 212 signals control circuit 208 to shut off the electric field.

Many circuits are possible which control the application of current based on a threshold level. This is but one embodiment of a shutoff circuit.

By way of non-limiting example, it is possible to use the methods and apparatuses taught by this invention for attaching a non-conducting member to a conducting member. Such examples include plastic body panels, interior and exterior trim components, window glass, hoses, and engine components such as composite valve covers and oil pans.

The amount of heating and temperature rise of the adhesive can be carefully controlled to avoid damaging the panel or coatings. Because the invention also monitors the state of cure of the adhesive, only the precise amount of heating is applied. Variations in the bond joint such as viscosity of the adhesive, joint thickness and/or width, or the location of the outer electrode with respect to the bond area all affect the dielectric heating of the adhesive. By maintaining the RF electric field until the plate current reaches a predetermined cure threshold, these variations are accounted for and the resulting bond joint is properly cured.

While certain representative embodiments and details have been shown for purposes of illustrating the invention, it will be apparent to those skilled in the art that various changes in the methods and apparatuses described herein may be made without departing from the scope of the invention, which is defined by the appended claims.

We claim:

1. A method of bonding a non-conductive member to an oil coated conductive member comprising the steps of:
   applying adhesive between mating surfaces of said conductive and non-conductive members, said adhesive contacting said oil coating;
   placing an electrode adjacent said non-conductive member overlying said mating surfaces; and
   applying a high frequency electric field between said electrode and said conductive member sufficient to cure said adhesive.
2. The method of claim 1 wherein said field is a pulsed electric field which varies the location of standing waves along said electrode.

* * * * *